(12) United States Patent
Nayshtut et al.

(10) Patent No.: US 10,387,642 B2
(45) Date of Patent: Aug. 20, 2019

(54) DYNAMIC RE-DISTRIBUTION OF DETECTION CONTENT AND ALGORITHMS FOR EXPLOIT DETECTION

(71) Applicant: McAfee, Inc., Santa Clara, CA (US)

(72) Inventors: Alex Nayshtut, Gan Yanve (IL); Igor Muttik, Berkhamsted (GB); Oleksandr Bazhaniuk, Hillsboro, OR (US); Yuriy Bulygin, Beaverton, OR (US); Andrew A. Furtak, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 192 days.

(21) Appl. No.: 15/391,409

(22) Filed: Dec. 27, 2016

(65) Prior Publication Data

US 2018/0181747 A1  Jun. 28, 2018

(51) Int. Cl.
    G06F 21/52   (2013.01)
    G06F 21/55   (2013.01)
    G06F 21/56   (2013.01)
    H04L 29/06   (2006.01)

(52) U.S. Cl.
    CPC .............. *G06F 21/52* (2013.01); *G06F 21/55* (2013.01); *G06F 21/552* (2013.01); *G06F 21/554* (2013.01); *G06F 21/566* (2013.01); *H04L 63/0263* (2013.01); *H04L 63/1416* (2013.01); *H04L 63/1425* (2013.01)

(58) Field of Classification Search
    CPC ......... G06F 19/00; G06F 15/00; B60K 15/04; B60K 15/05; B65D 51/18
    See application file for complete search history.

(56) References Cited

U.S. PATENT DOCUMENTS

2006/0098585 A1*  5/2006  Singh ............... H04L 63/1416
                                                        370/252

FOREIGN PATENT DOCUMENTS

| CN | 1694411 | * | 2/2008 |
| CN | 100372296 |   | 2/2008 |
| EP | 2575313 |   | 4/2013 |

OTHER PUBLICATIONS

International Searching Authority, "International Search Report and Written Opinion," mailed in connection with International Patent Application No. PCT/US2017/068508, dated Mar. 9, 2018, 12 pages.

* cited by examiner

*Primary Examiner* — Harunur Rashid
(74) *Attorney, Agent, or Firm* — Hanley, Flight & Zimmerman, LLC

(57) ABSTRACT

A predetermined standard set of detection algorithms and content and a selected set of enhanced detection algorithms and content provide an improved technique for detecting security exploits. The detection algorithms and content are executed on a Platform Exploit Detection Module. Standard detection algorithms and content are deployed across all endpoints. Enhanced detection algorithms and content are selected from an available set of enhanced detection algorithms and content to improve detection capability without the performance impacts of deploying every enhanced detection algorithm and content on every endpoint. A network of endpoints may deploy an entire set of detection algorithms and content across all endpoints, with individual endpoints configured to with different subsets of the enhanced detection algorithms and content.

15 Claims, 8 Drawing Sheets

DYNAMIC RE-DISTRIBUTION OF DETECTION CONTENT AND ALGORITHMS FOR EXPLOIT DETECTION

TECHNICAL FIELD

Embodiments described herein generally relate to computer security and more specifically to the detection of security exploits using hardware capabilities.

BACKGROUND ART

Malware attacks are growing despite advancement in recent hardware and software mitigation techniques. Attackers have developed techniques to avoid being detected by anti-virus (AV) vendors. Some exploitation techniques in use today are known as Return Oriented Programming (ROP), Call Oriented Programming (COP), and Jump Oriented Programming (JOP). ROPs, COPs, and JOPs are code reuse attacks which allow attackers to construct malicious code from small fragments (gadgets) of the exploited applications, thus eliminating the need for code injection.

These exploits bypass data mitigation techniques such as Data Execution Prevention (DEP) or Address Space Layout Randomization (ASLR) because code reuse techniques provide attackers enough flexibility to customize the exploits and avoid security controls—a real advantage in the cyber "cat and mouse" game.

Modern computer processing elements have a Performance Monitoring Unit (PMU) for monitoring behavioral data about selected events. The diagram in FIG. 7 illustrates the core PMU and related registers 700 on Intel x86 processors. Processors from different manufacturers may have similar PMUs, although architectural details may differ. The PMU 710 has a plurality of fixed purpose counters 720. Each fixed purpose counter 720 can count only one architectural performance event, thus simplifying the configuration part. In addition to the fixed purpose counters 720, the Core PMU also supports a plurality of general purpose counters 730 that are capable of counting any activity occurring in the core. Each Core PMU 710 also has a set of control registers 740, 760, to assist with programming the fixed purpose counters 720 and general purpose counters 730. The PMU 710 also has Event Select registers 750 that correspond to each fixed purpose counter 720 and general purpose counter 730, which allows for specification of the exact event that should be counted. A global control register 760 allows enabling or disabling the counters 720, 730. A global status register 770 allows software to query counter overflow conditions on combinations of fixed purpose counters 720 and general purpose counters 730. A global overflow control register 780 allows software to clear counter overflow conditions on any combination of fixed-purpose counters 720 and general purpose counters 730. The elements illustrated in FIG. 7 are illustrative and by way of example only, and other elements and arrangements of elements may be provided as desired.

Modern processor architectures also provide a branch recording mechanism. Typically, the last branch recording mechanism tracks not only branch instructions (like JMP, Jcc, LOOP, and CALL instructions), but also other operations that cause a change in the instruction pointer, like external interrupts, traps, and faults. The branch recording mechanisms generally employ a set of processor model specific registers, referred to as a last branch record (LBR) stack, each entry of which stores a source address and a destination address of the last branch, thus the LBR stack provides a record of recent branches. Some embodiments of an LBR stack may also record an indication of whether the branch was mispredicted, i.e., one or more of the target of the branch and the direction (taken, not taken) was mispredicted. In addition, control registers may allow the processor to filter which kinds of branches are to be captured in the LBR stack. FIG. 8 is a block diagram illustrating an LBR stack 800 with two sets of registers 810A and 810B. Each LBR stack entry 810 includes one register with a from address field 820 and a mispredicted indicator 830, and another register with a to address field 840. Although only 2 LBR stack entries 810 are illustrated in the LBR stack 800 of FIG. 8 for clarity, implementations typically have more LBR stack entries 810. Although illustrated with the mispredict indicator as part of the register containing the from address 820, embodiments may place the mispredict indicator as part of the register containing the to address 840, or may place the mispredict indicator in a third register (not shown in FIG. 8). Other fields may be included in the LBR stack 800 as desired.

One of the ways the Event Select registers 750 may be configured is to cause the PMU 710 to count branch mispredict events. These events may be caused by ROP and JOP exploits, as well as for other reasons. Where branch capture filtering is available, the filter may be employed to limit the captured branches to those of interest in ROP or JOP exploits. For JOP exploits, the branches of interest are typically near indirect jumps. For ROP exploits, the branches of interest are typically CALLs or RETs. However, embodiments may filter other types of branches or do no branch capture filtering, if desired. For example COPs use gadgets that end with indirect CALL instructions. In COP exploits, gadgets are chained together by pointing the memory-indirect locations to the next gadget in sequence. COP exploits may be detected using a similar approach to that used for detecting ROP and JOP exploits, with the branches of interest being CALLs.

However, current solutions suffer from a limitation: in order to ensure usability, detection efficacy, and to make bypasses hard or non-economical there is a need to monitor multiple PMU elements and apply complex detection algorithms, which leads to performance overhead. Compromises have been made to achieve good performance by sacrificing expensive analysis and more frequent monitoring of the counters. Unfortunately, this opens a possibility for crafting some code reuse attacks.

DESCRIPTION OF EMBODIMENTS

Figure 1:
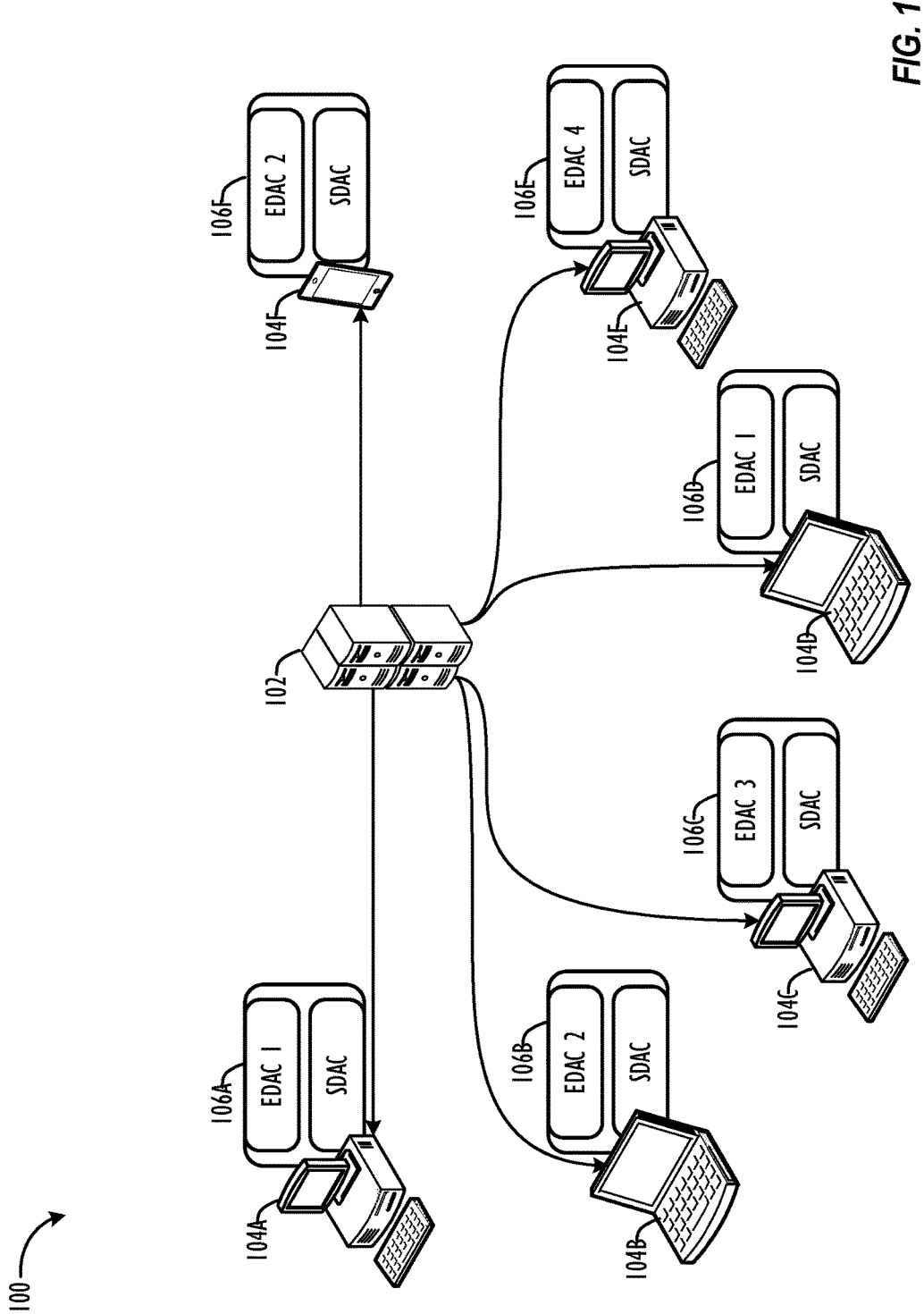
FIG. 1 is a system of computers illustrating a protected environment according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As disclosed below, detection algorithms and content (DACs) are used to detect code reuse and other types of security exploits. Although written in terms of code reuse attacks, DACs may be used for the detection of other types of security exploits. In some embodiments, the DACs include one or more predetermined DACs, referred to herein as standard detection algorithms and content (SDACs) and additional DACs that may be selected for use with the SDACs, referred to herein as enhanced detection algorithms and content (EDACs).

SDACs may use exploit detection metrics that may be retrievable from a processor. Metrics may include, but are not limited to, instructions retired, elapsed core clock ticks, core frequency, L2 cache hits and misses, L3 cache misses and hits (including or excluding snoops), bytes read from memory controller(s), bytes written to memory controller(s), data traffic transferred by interconnect links, and metrics that may be extracted from the PMU, as well as algorithms and heuristics, thresholds, configurations, and data types.

EDACs may use additional metrics. The EDAC may be based on metrics used by the SDACs or may be independent metrics. EDAC subsets may be randomly or periodically enabled in addition to the SDACs. This creates fluidity and non-uniformity of deployed DACs, requiring attackers to create a bypass for the superset of all deployed DAC subsets. This is significantly more complicated and may even be impossible. Both the SDACs and the EDACs may be constructed to provide detection for specific types of security exploits, and selection of the EDACs to use in addition to the SDACs may be based on performance overhead and limits defined by an information technology (IT) security policy.

FIG. 1 is a system 100 of computers illustrating a protected environment according to one embodiment. A server 102 is connected via network infrastructure to multiple endpoints 104A-F. The endpoints 104A-F may be any type of programmable device, including laptop computers, desktop computers, mobile devices such as cell phones and tablets, and Internet of Things devices. Endpoints 104A-F may also be other servers or gateways to other networks. Localized to each endpoint is a set of DACs 106A-F, which include both SDACs and EDACs. In some embodiments, a DAC set may include only SDACs, but typically both SDACs and one or more EDACs are included.

In some networks EDACs may be deployed so that at any given moment in time every available EDAC may be deployed on at least one endpoint 104, but each individual endpoint 104A-F carries only a subset of the available EDACs, avoiding the performance impact of installing every EDAC on each endpoint 104. Such a variable deployment of EDACs provides a kind of herd protection, making the network as a whole more resilient to attacks than a uniform deployment of the collection of SDACs and the same subset of available EDACs on all endpoints 104. As illustrated in FIG. 1, EDACs 1-4 are available, all endpoints 104A-104F deploy the SDACs, and endpoints 104A and 104D (which may be different kinds of devices) deploy EDAC 1, endpoints 104B and 104F deploy EDAC 2, endpoints 104C deploys EDAC 3 and endpoint 104E deploys EDAC 4. Thus, as illustrated in FIG. 1, every EDAC is deployed on at least one endpoint 104, but the EDACs deployed on an endpoint may vary, with no endpoint 104 deploys all of the EDACs. The deployment of EDACs of FIG. 1 is illustrative and by way of example only, and other deployment patterns may be used as desired. In some networks, different sets of SDACs may also be deployed, such as situations where the deployment may vary depending on the nature of the endpoint on which the SDACs are deployed, so that different devices may have different SDACs in some embodiments.

In some embodiments, server 102 may distribute specific EDACs 1-4 to the endpoints 104A-F. In other embodiments, endpoints 104A-F may have a collection of EDACs, which may be obtained from the server 102 or elsewhere, and the server 102 may provide instructions or a security policy to the endpoints 104 on which EDACs from the collection of EDACs to deploy. In some embodiments, the EDACs deployed on endpoints 104A-F may vary over time.

The SDACs may be provisioned at the endpoints 104A-F in any desired way. For example, the server 102 (or another device not illustrated in FIG. 1) may distribute the SDACs to each of the endpoints 104A-F. From time to time, the SDACs may be updated as changes in the SDACs may be desired.

Figure 2:
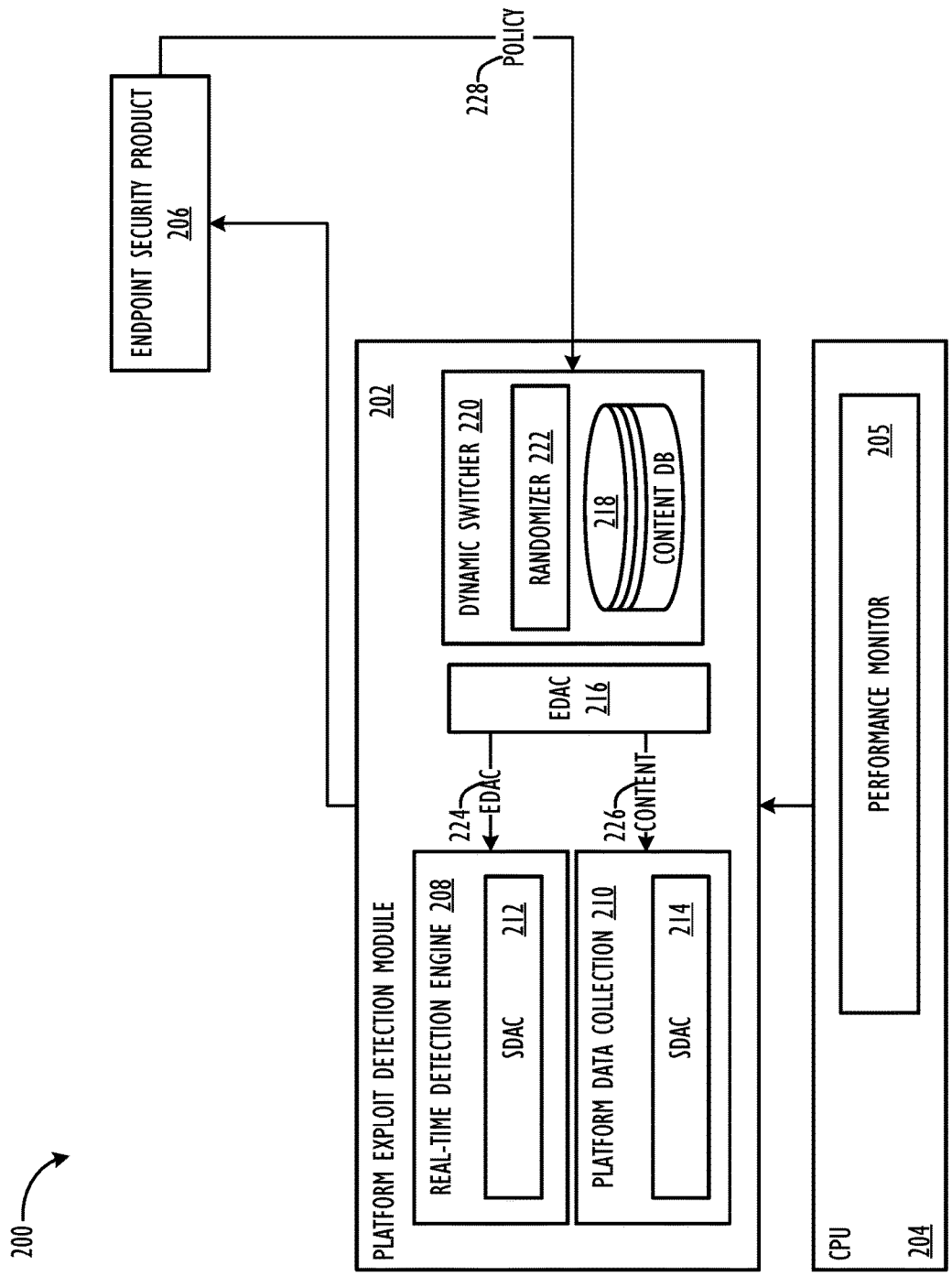
FIG. 2 is a block diagram illustrating a computing device for the detection of security exploits according to one embodiment.

FIG. 2 is a block diagram 200 illustrating a computing device for the detection of security exploits according to one embodiment. The Platform Exploit Detection Module 202 may include a Platform Data Collector (PDC) 210, a Real-time Detection Engine (RTDE) 208, a dynamic switcher 220 and the Detection Content database (DB) 218.

The PDC 210 collects metrics from the PMU 205 of the host processor 204. This may be accomplished using application programming interfaces (APIs) that provide hooks into the PMU internal to the host processor 204. In this embodiment, the SDAC comprises two portions 212 and 214. The PDC 210 collects the data specified by the SDAC portion 214. The RTDE 208 applies real-time detection techniques as defined by the SDAC portion 212. Although described herein only in terms of SDACs and EDACs, in some embodiments, the RTDE 208 may provide other detection functionality similar to a conventional anti-malware application, including the monitoring of critical system calls, as well as viral signature matching, using data some of which may be collected by the PDC 210. The PDC 210 may store the metrics for further more in depth analysis. Although generally described herein as collecting metrics from the PMU 205, embodiments may collect additional metrics from other sources as desired.

The Dynamic Switcher 220 determines which EDAC 216 to apply at any given time. The Dynamic Switcher 220 may use a Randomizer 222 to select an EDAC 216 at random from the collection of available EDACs available from the content DB 218. Non-random selection techniques may be used in some embodiments. For example, the Dynamic Switcher 220 may utilize an EDAC 216 specified in a policy or other instructions 228 received from server 102 or elsewhere. The Content DB 218 may include all of the EDACs 216 and the SDACs 212,214. Alternately, the EDAC 216 may be received by the platform exploit detection module 202 from the server 102 or elsewhere. In some embodiments, the Dynamic Switcher 220 or any other portion of the platform exploit detection module 202 may execute in a secure execution environment, such as a trusted platform hardware module or a software-defined security enclave.

Once the EDAC 216s are selected by the Dynamic Switcher 220, algorithms 224 for the EDACs 216 may be provisioned in the RTDE 208. Additionally, content 226 for the EDAC 216 may be provisioned in the PDC 210. The content 226 may indicate metrics to be collected by the PDC 210 necessary to facilitate the algorithms 224. Where the content 226 indicates metrics not collected by the SDAC 214, the PDC 210 may be reconfigured in order to collect the additional metrics needed by the algorithms 224 of the EDAC 216.

In some embodiments, the content DB 218 may include a repository of heuristics, algorithms, thresholds, configurations, data types, and other data that may be useful for exploit detection. In some embodiments, the dynamic Switcher 220 may generate the EDAC 216 from one or more elements stored in the content DB 218 prior to sending the EDAC 216 to the real-time detection engine 208 and platform data collection module 210.

Upon the detection of an exploit by the RTDE 208, the Platform Exploit Detection Module 202 may notify an endpoint security product 206. The endpoint security product 206 may be a separate logical entity from the Platform Exploit Detection Module 202, or alternatively, the Platform Exploit Detection Module 202 may exist as a logical module within the endpoint security product 206. In some embodiments, the endpoint security product may be on the same programmable device as the platform exploit detection module 202. In other embodiments, the endpoint security product may be remote to the Platform Exploit Detection Module 202 and the indication of an exploit may be transmitted via a network connecting the devices. The indication generated by the Platform Exploit Detection Module 202 may be any desired type of indication, and may include any or all of the information generated by the PDC 210 and real-time detection engine 208.

Figure 3:
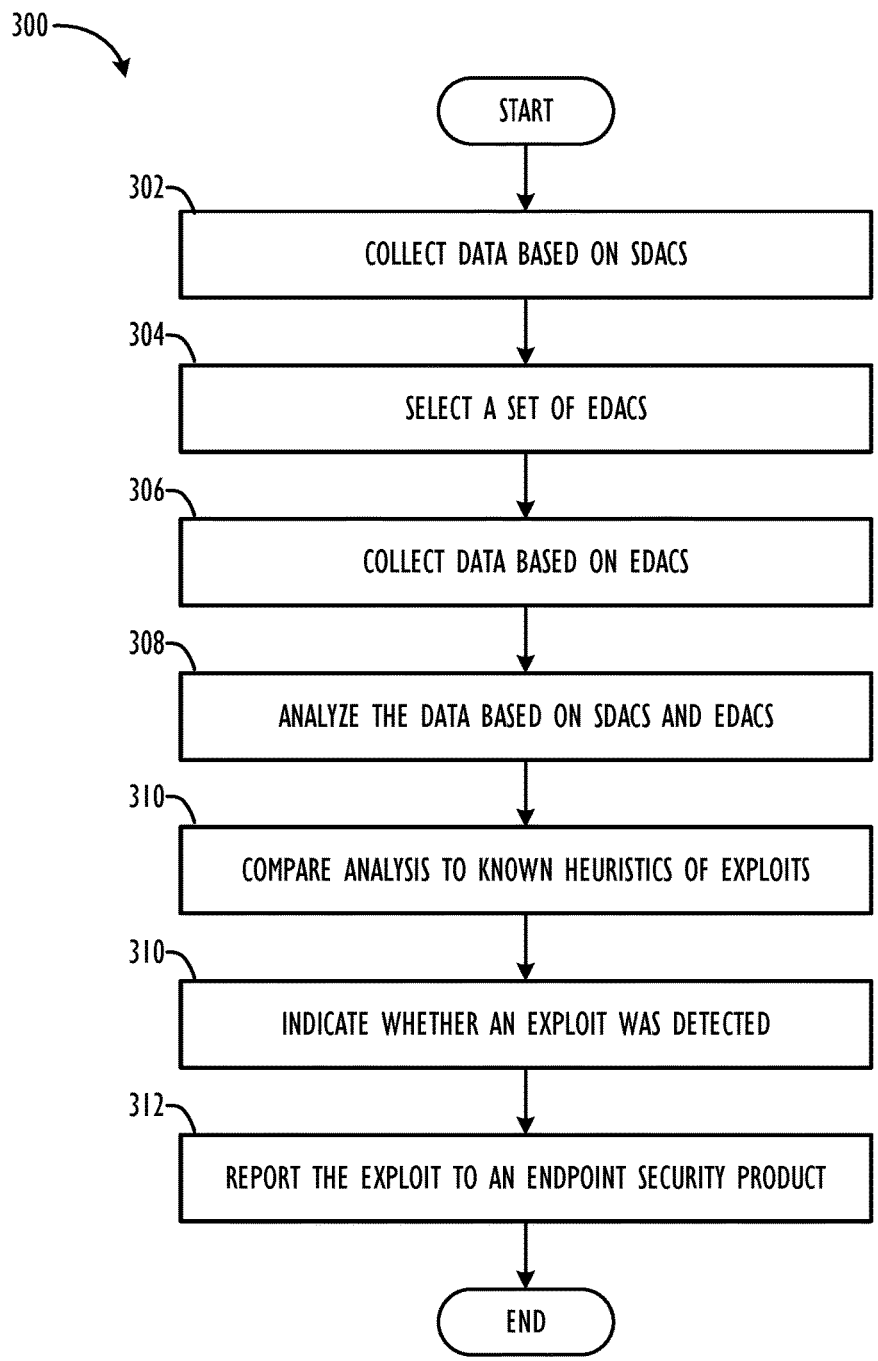
FIG. 3 is a flowchart illustrating a technique for applying security exploit detection techniques according to another embodiment.

FIG. 3 is a flowchart 300 illustrating a technique for applying exploit detection techniques according to one embodiment. The flowchart 300 starts at block 302 where data is collected from the PMU 205 by the PDC 210 based on the SDACs 214. The SDACs 214 in this embodiment may have been received, or predetermined. At block 304, a set of one or more EDACs 216 is selected. The EDACs 216 may be selected in any desired way, including randomly, or based on a policy.

At block 306, additional data may be collected based on the selected EDACs 216. At block 308, the data and metrics collected by the SDAC 214 and the EDACs 216 is analyzed in the real-time detection engine 208. This may include applying algorithms included with the SDACs 212 and the EDACs 216 to analyze or process the data collected by the PDC 210 from the PMU 205.

At block 308, the analyzed data is then compared to known exploits. This may include the execution of algorithms specifically designed to extract profiles of certain types of exploit attacks out of the data collected by the SDACs 214 and EDACs 216.

At block 310, an exploit may be indicated if detected. An indication that the exploit has been detected may include the suspension of affected code execution, the killing of the affected code execution, removing execution to a protected "sandbox" for further evaluation, an event notification processed by an event handler or any other type of indication known in the art. Some indications may involve simply reporting the exploit, perhaps including data about the exploit, and some indications may involve taking an action based upon the detection of the exploit.

At block 312, the exploit, if detected, may be reported to an endpoint security product 206. In some embodiments, the endpoint security product may take actions to prevent or reduce the impact of the exploit, such as issuing commands to kill the execution of the affected code, or removing execution to a protected "sandbox" for further evaluation. Additionally, the endpoint security product 206 may report the exploit to a remote server, such as a global threat security service that monitors and tracks details about exploits caught "in the wild." The data sent to the endpoint security product 206 may include information to identify potential candidate exploits based on the analyzing heuristics and algorithms.

Figure 4:
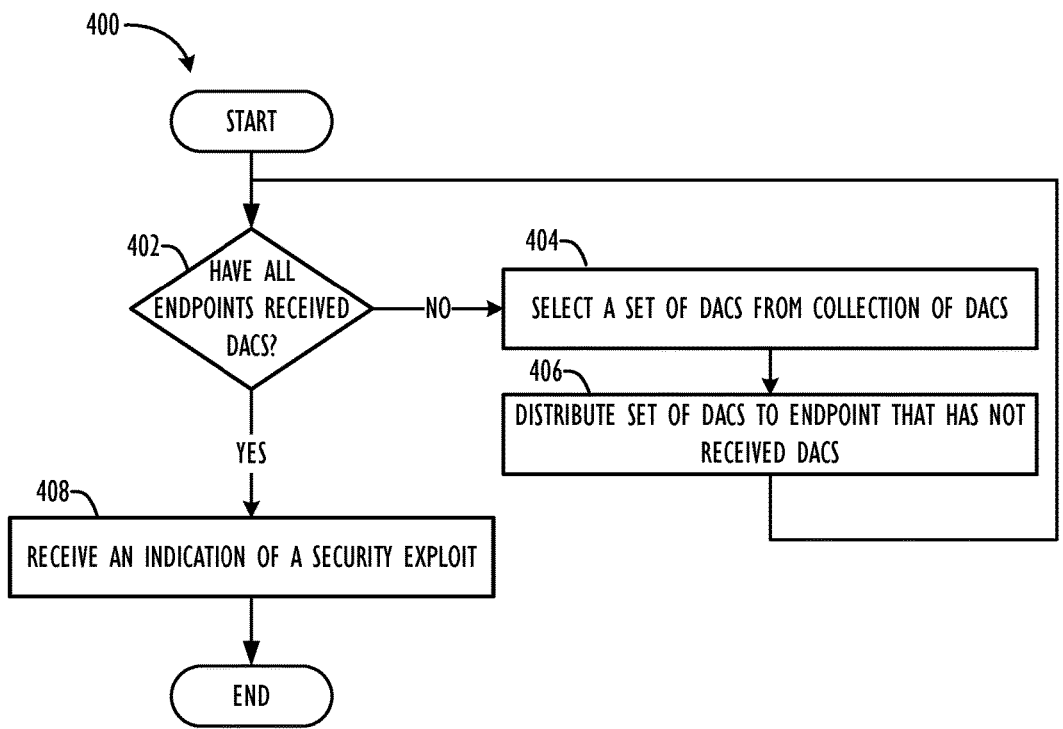
FIG. 4 is a flowchart illustrating a technique for distributing security exploit detection techniques according to one embodiment.

FIG. 4 is a flowchart 400 illustrating a technique for distributing DACs according to one embodiment.

Flowchart 400 begins at a decision block 402. Decision block 402 evaluates whether all endpoints have received a set of DACs. The DACs may constitute a combination of SDACs 212, 214, commonly deployed over all endpoints 104, and EDACs 216, which may vary across endpoints 104.

As illustrated in FIG. 1, a server 102 may be responsible for deploying the DACs to all endpoints 104, including both SDACs 212, 214 and EDACs 216, using any desired distribution technique. Alternatively, each of the endpoints 104A-F may include predetermined SDACs 212, 214 and the server 102 only deploys the EDACs 216. In embodiments in which EDACs 216 are generated from algorithms and content stored in the content DB 218, the distribution of EDACs 216 may be performed as a distribution of the algorithms and content that may be used to generate the EDACs 216 by the Dynamic Switcher 220.

When distributing DACs, the flowchart 400 continues to block 404 where a set of DACs from a collection of DACs is selected. This collection of DACs for distribution may be maintained in any desired way, including a database of DACs or DAC elements. The selection of DACs may include the selection of the set of common SDACs 212, 214 for delivery to every endpoint 104, and a dynamic set of EDACs for delivery to specific endpoints 104. In some embodiments, the EDACs 216 may be distributed in such a way that every available EDAC 216 is deployed to at least one endpoint 104, even though individual endpoints 104 have a different set of EDACs 216. In other embodiments, only a subset of the available EDACs 216 may be distributed to the endpoints 104.

At block 406, the selected set of DACs is distributed to an endpoint 104 that has not received a set of DACs. Block 406 then flows back to the decision block 402.

Once all endpoints have received a set of DACs, the flowchart 400 proceeds to block 408 in which the DAC distribution server 102, which also serves as an endpoint security product 206, receives indications of security exploits from the endpoints 104 after use of the DACs detects an exploit. Upon the receipt of security exploits from the endpoints 104, the server 102 may provide additional analysis describing the types of exploits affecting different endpoints 104A-F in different physical locations. Accordingly, the server 102 may trigger block 402 and redeploy the DACs to the endpoints 104, utilizing a different set of EDACs. In some embodiments, detection of an exploit may cause distribution of a different set of EDACs to target the reported exploits further. In some embodiments, the server 102 may distribute updates to SDACs 212, 214 or EDACs 216 from time to time. In some embodiments, the server 102 may distribute a different set of EDACs 216 to the various endpoints 104 from time to time, so that someone attempting to deploy an exploit cannot depend upon knowledge of a previously detected set of EDACs on any given endpoint 104.

Figure 5:
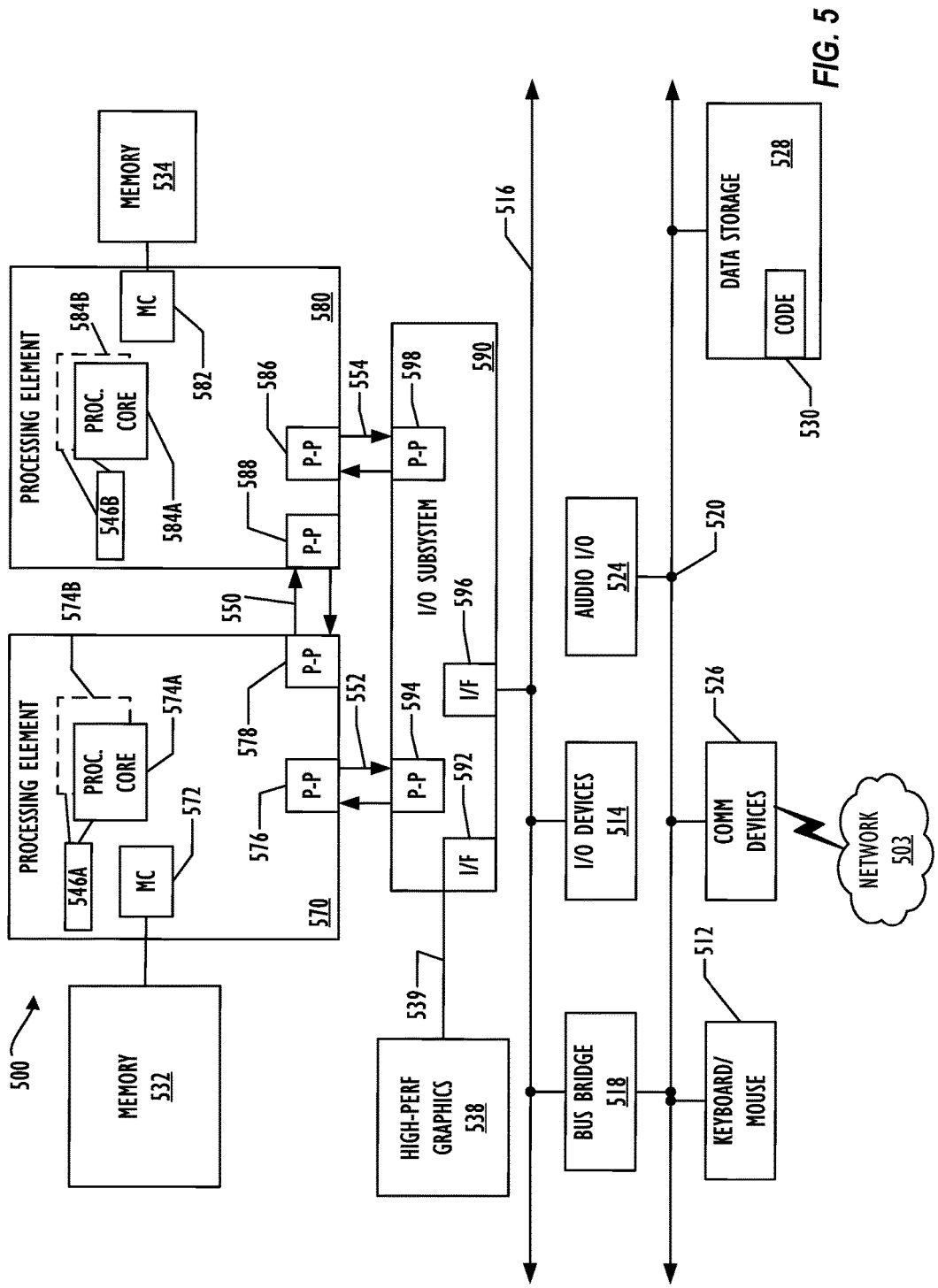
FIG. 5 is a block diagram illustrating a computing device for use with techniques described herein according to one or more embodiments.

Referring now to FIG. 5, a block diagram illustrates a programmable device 500 that may be used for implementing the techniques described herein in accordance with one or more embodiments. The programmable device 500 illustrated in FIG. 5 is a multiprocessor programmable device that includes a first processing element 570 and a second processing element 580. While two processing elements 570 and 580 are shown, an embodiment of programmable device 600 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., computing instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

Figure 6:
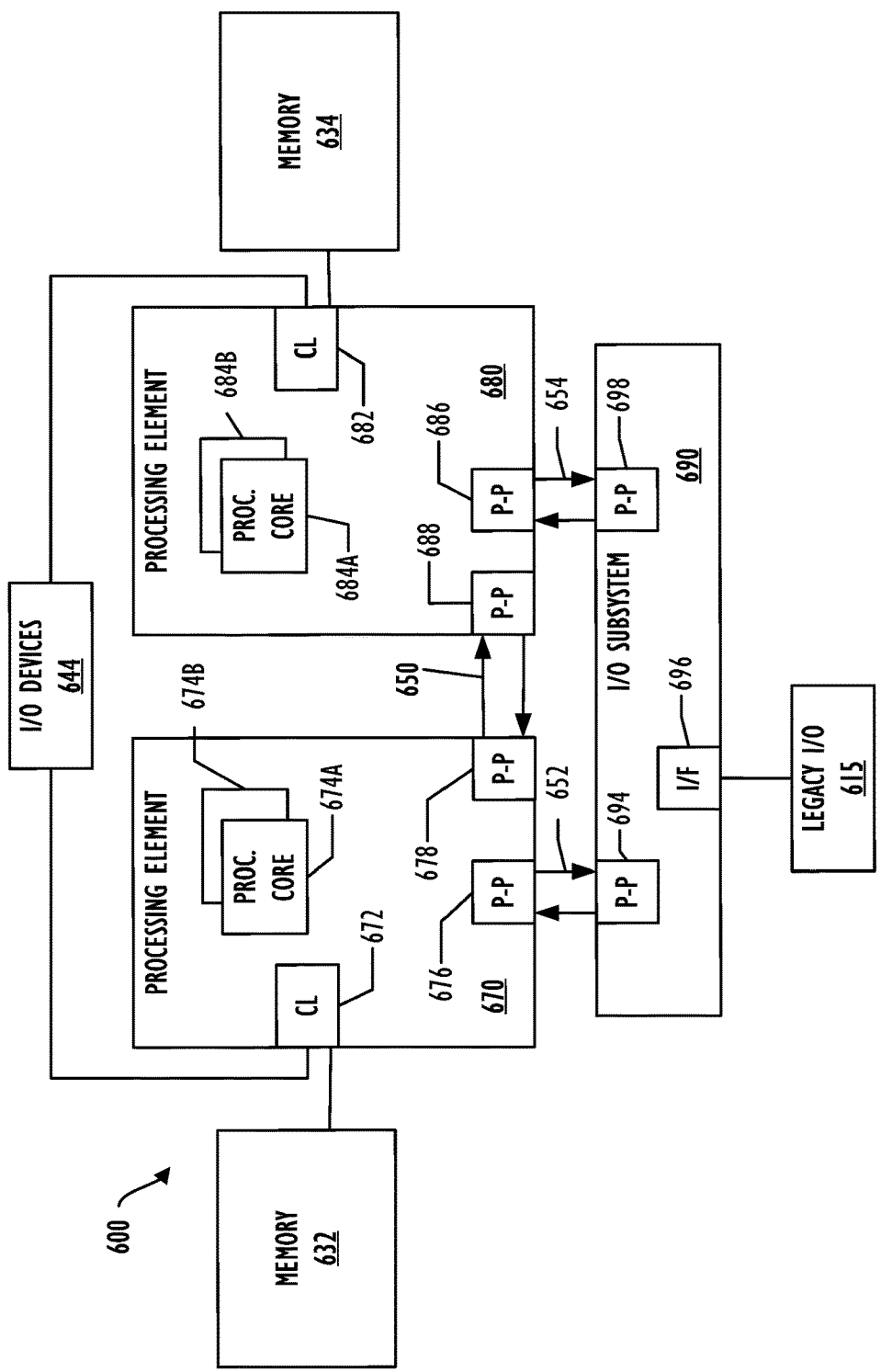
FIG. 6 is a block diagram illustrating a computing device for use with techniques described herein according to one or more embodiments.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 6, MCs 572 and 682 couple processing elements 570, 580 to respective memories, namely a memory 532 and a memory 534, which may be portions of main memory locally attached to the respective processors. While MC logic 572 and 582 is illustrated as integrated into processing elements 570, 680, in some embodiments the memory controller logic may be discrete logic outside processing elements 570, 580 rather than integrated therein.

Figure 7:
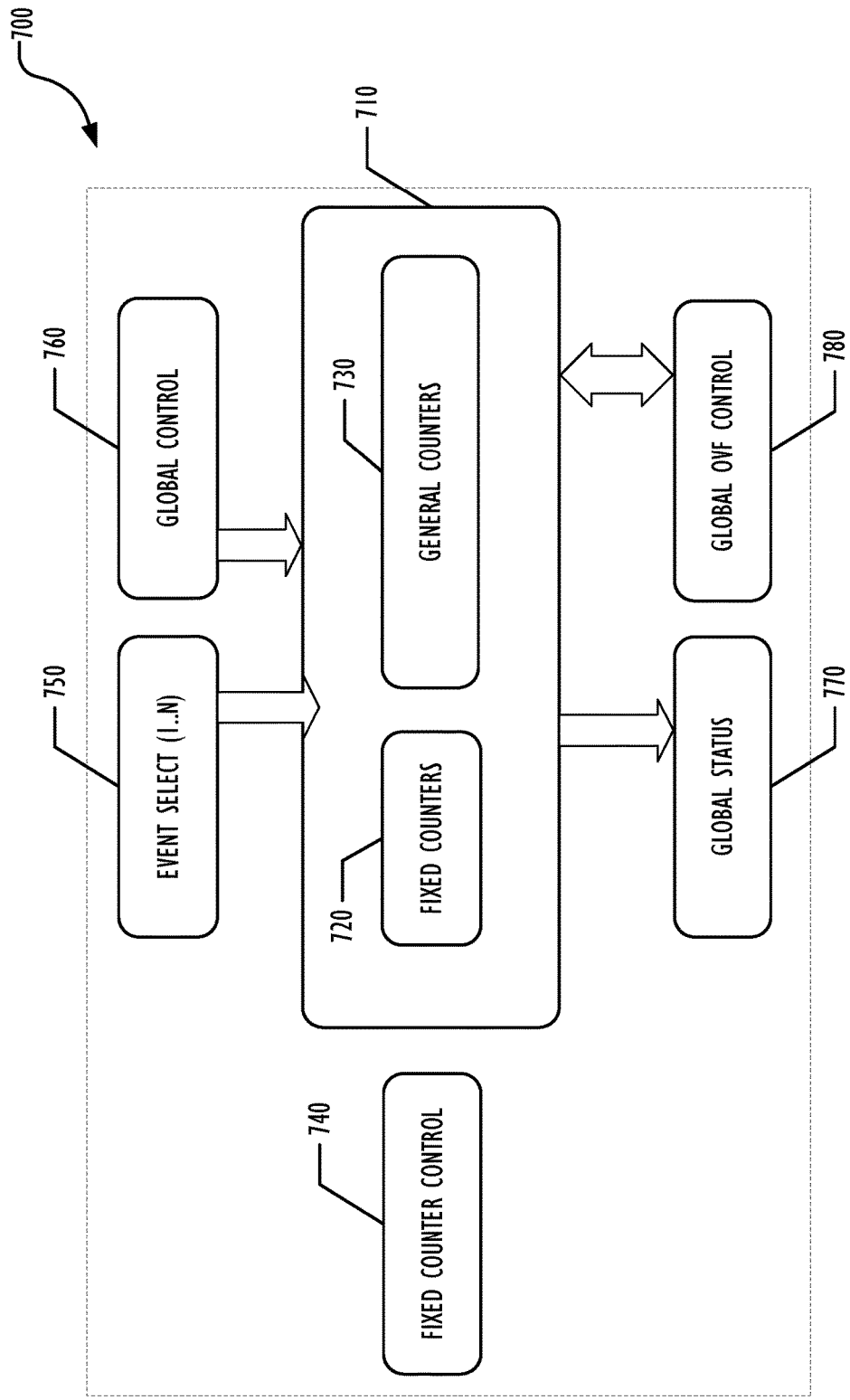
FIG. 7 is a block diagram illustrating an example of existing performance monitor hardware that may be used for the exploit detection techniques described below.
Figure 8:
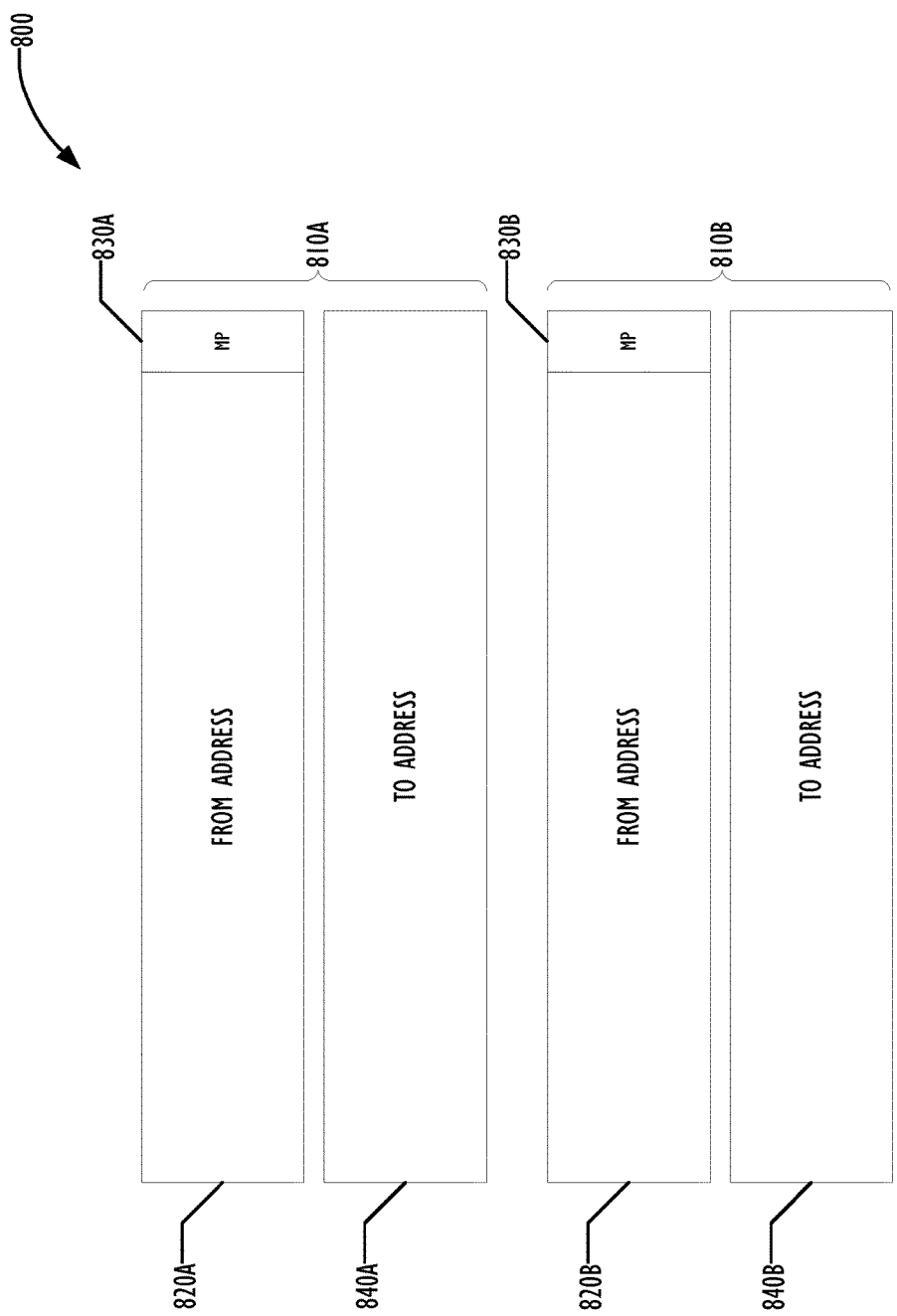
FIG. 8 is a block diagram illustrating an example of existing last branch recording hardware that may be used for the exploit detection techniques described below.

Processing element 570 and processing element 580 may be coupled to an I/O subsystem 590 via respective P-P interconnects 576 and 586 through links 552 and 554. As illustrated in FIG. 7, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526, such as a network adapter, (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The following examples pertain to further embodiments.

Example 1 is a machine readable medium on which are stored instructions for improving the detection of computer security exploits, comprising instructions that when executed causes a machine to: collect, using a predetermined set of detection algorithms and content, a first set of behavioral data from a processing element of the machine; select a second set of detection algorithms and content from a collection of detection algorithms and content; collect, using the second set of detection algorithms and content, a second set of behavioral data from the processing element; analyze the first set of behavioral data and the second set of behavioral data in real time using the predetermined set of detection algorithms and content and the second set of detection algorithms and content; and indicate whether an exploit was detected by the analysis.

In Example 2 the subject matter of Example 1 optionally includes wherein the instructions that when executed cause the machine to indicate whether an exploit was detected comprise instructions that when executed cause the machine to report the exploit to an endpoint security product.

In Example 3 the subject matter of Example 1 optionally includes wherein instructions that when executed cause the machine to collect the first set of behavioral data comprise instructions that when executed cause the machine to: extract data from a performance monitoring unit of the processing element; and store the data in a platform data collection module.

In Example 4 the subject matter of any of Examples 1-3 optionally includes wherein the exploit comprises a return oriented programming attack, a jump oriented programming attack, or a call oriented programming attack.

In Example 5 the subject matter of any of Examples 1-3 optionally includes wherein the second set of detection algorithms and content are selected randomly from the collection of detection algorithms and data.

In Example 6 the subject matter of any of Examples 1-3 optionally includes wherein the instructions that when executed cause the machine to analyze the first set of behavioral data and the second set of behavioral data in real time comprise instructions that when executed cause the machine to compare the analysis to characteristics of known exploits.

Example 7 is a programmable device configured for the detection of computer security exploits, comprising: one or more processing elements; one or more network adapters communicatively coupled to the one or more processing elements; and memory coupled to the one or more processing elements on which are stored instructions, comprising instructions that when executed causes at least some of the one or more processing elements to: collect, using a predetermined set of detection algorithms and content, a first set of behavioral data from a first processing element of the one or more processing elements; select a second set of detection algorithms and content from a collection of detection algorithms and data; collect, using the second set of detection algorithms and content, a second set of behavioral data from the first processing element; analyze the first set of behavioral data and the second set of behavioral data in real time using the predetermined set of detection algorithms and content and the second set of detection algorithms and content; and indicate whether an exploit was detected by the analysis.

In Example 8 the subject matter of Example 7 optionally includes wherein the second set of detection algorithms and content are selected randomly from the collection of detection algorithms and data.

In Example 9 the subject matter of Example 7 optionally includes wherein the instructions that when executed cause at least some of the one or more processing elements to collect the first set of behavioral data comprise instructions that when executed cause at least some of the one or more processing elements to: extract data from a performance monitoring unit of the one or more processing elements; and store the data in a platform data collection module.

In Example 10 the subject matter of any of Examples 7-9 optionally includes wherein the exploit comprises a return oriented programming attack, a jump oriented programming attack, or a call oriented programming attack.

In Example 11 the subject matter of any of Examples 7-9 optionally includes wherein the instructions that when executed cause at least some of the one or more processing elements to select the second set of detection algorithms and content comprise instructions that when executed cause at least some of the one or more processing elements to receive a policy indicating the second set of detection algorithms and content from a collection of detection algorithms and data.

In Example 12 the subject matter of any of Examples 7-9 optionally includes wherein the instructions that when executed cause at least some of the one or more processing elements to analyze the first set of behavioral data and the second set of behavioral data in real time comprise instructions that when executed cause at least some of the one or more processing elements to compare the analysis to characteristics of known exploits.

In Example 13 the subject matter of Example 12 optionally includes wherein the instructions that when executed cause at least some of the one or more processing elements to indicate whether an exploit was detected by the analysis comprise instructions that when executed cause at least some of the one or more processing elements to report the exploit to an endpoint security product.

Example 14 is a method for improving the detection of computer security exploits comprising: collecting, using a predetermined set of detection algorithms and content, a first set of behavioral data from a processing element of a programmable device; selecting a second set of detection algorithms and content from a collection of detection algorithms and data; collecting, using the second set of detection algorithms and content, a second set of behavioral data from the processing element; analyzing the first set of behavioral data and the second set of behavioral data in real time using the predetermined set of detection algorithms and content and the second set of detection algorithms and content; and indicating whether a security exploit was detected by the analysis.

In Example 15 the subject matter of Example 14 optionally includes wherein the second set of detection algorithms and content are selected randomly from the collection of detection algorithms and data.

In Example 16 the subject matter of any of Examples 14-15 optionally includes wherein collecting the first set of behavioral data comprises: extracting data from a performance monitoring unit of the processing element; and storing the data in a platform data collection module.

In Example 17 the subject matter of any of Examples 14-15 optionally includes wherein selecting a second set of detection algorithms and content comprises receiving a policy indicating the second set of detection algorithms and content from the collection of detection algorithms and data.

In Example 18 the subject matter of any of Examples 14-15 optionally includes wherein analyzing the first set of behavioral data and the second set of behavioral data in real time comprises comparing the analysis to characteristics of known exploits.

In Example 19 the subject matter of any of Examples 14-15 optionally includes wherein indicating whether an exploit was detected by the analysis comprises reporting the exploit to an endpoint security product.

Example 20 is a system for improving the detection of computer security exploits comprising: one or more processing elements; one or more network adapters communicatively coupled to the one or more processing elements; and memory coupled to the one or more processing elements on which are stored instructions, comprising instructions that when executed cause at least some of the one or more processing elements to: select and distribute a first set of detection algorithms and content from a collection of detection algorithms and content to a first endpoint of a plurality of endpoints, the first set of detection algorithms and content differing from a predetermined set of detection algorithms and content held by the first endpoint; and receive an indication of a security exploit event from the first endpoint of the plurality of endpoints detected by one or more of the first set of detection algorithms and content and the predetermined set of detection algorithms and content.

In Example 21 the subject matter of Example 20 optionally includes wherein the first set of detection algorithms and content comprises heuristics and algorithms, based in part on the predetermined set of detection algorithms and content, indicative of an exploit event.

In Example 22 the subject matter of any of Examples 20-21 optionally includes further comprising instructions that when executed cause at least some of the one or more processing elements to: select and distribute a second set of detection algorithms and content from the collection of detection algorithms and content to a second endpoint of the plurality of endpoints, the second set of detection algorithms and content differing from the predetermined set of detection algorithms, the first set of detection algorithms and content, and content held by the second endpoint; and receive an indication of a second security exploit event from the second endpoint of the plurality of endpoints detected by one or more of the second set of detection algorithms and content and the predetermined set of detection algorithms and content.

In Example 23 the subject matter of Example 22 optionally includes wherein the first set of detection algorithms and content and the second set of detection algorithms and content cumulatively includes the collection of detection algorithms and data.

In Example 24 the subject matter of any of Examples 20-21 optionally includes further comprising instructions that when executed cause at least some of the one or more processing elements to update the first set of detection algorithms and content responsive to the received indication of the security exploit event.

In Example 25 the subject matter of any of Examples 20-21 optionally includes further comprising instructions that when executed cause at least some of the one or more processing elements to distribute the predetermined set of detection algorithms and content to the plurality of endpoints by the one or more network adapters.

Example 26 is an apparatus for improving the detection of computer security exploits, comprising: means for collecting, using a predetermined set of detection algorithms and content, a first set of behavioral data from a processing element of the machine; means for selecting a second set of detection algorithms and content from a collection of detection algorithms and content; means for collecting, using the second set of detection algorithms and content, a second set of behavioral data from the processing element; means for analyzing the first set of behavioral data and the second set of behavioral data in real time using the predetermined set of detection algorithms and content and the second set of detection algorithms and content; and means for indicating whether an exploit was detected by the analysis.

In Example 27 the subject matter of Example 26 optionally includes wherein the means for indicating whether an exploit was detected comprises means for reporting the exploit to an endpoint security product.

In Example 28 the subject matter of Example 26 optionally includes wherein the means for collecting the first set of behavioral data comprises: means for extracting data from a performance monitoring unit of the processing element; and means for storing the data in a platform data collection module.

In Example 29 the subject matter of any of Examples 26-28 optionally includes wherein the exploit comprises a return oriented programming attack, a jump oriented programming attack, or a call oriented programming attack.

In Example 30 the subject matter of any of Examples 26-28 optionally includes wherein the second set of detection algorithms and content are selected randomly from the collection of detection algorithms and data.

In Example 31 the subject matter of any of Examples 26-28 optionally includes wherein the means for analyzing the first set of behavioral data and the second set of behavioral data in real time comprises means for comparing the analysis to characteristics of known exploits.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage disk or storage device comprising instructions that, when executed, cause a processor of a first endpoint of a plurality of endpoints to at least:
   access standard detection algorithms and content (SDACs);
   access a first set of enhanced detection algorithms and content (EDACs) of a plurality of sets of EDACs, the SDACs and different ones of the sets of EDACs to be initially deployed to respective ones of the endpoints from a server;
   generate a first set of behavioral data associated with the processor of the first endpoint based on the SDACs;
   generate a second set of behavioral data associated with the processor based on one or more EDACs selected randomly from the first set of EDACs;
   extract a first profile based on analyzing the first set of behavioral data and the second set of behavioral data in real time;
   compare the first profile to a plurality of profiles including a second profile, the profiles corresponding to characteristics of known exploit attacks;
   determine the first profile corresponds to the second profile based on the comparison, the second profile corresponding to an exploit attack; and
   transmit an alert indicative of the exploit attack to an endpoint security product associated with the server to cause the server to distribute the first set of EDACs to a second one of the endpoints to facilitate detection of the exploit attack at the second endpoint.

2. The storage disk or storage device of claim 1, wherein the instructions, when executed, cause the first endpoint to generate at least one of the first set of behavioral data or the second set of behavioral data by:
   extracting data from a performance monitoring unit associated with the processor; and
   storing the data in a platform data collection module.

3. The storage disk or storage device of claim 1, wherein the exploit attack is a return oriented programming attack, a jump oriented programming attack, or a call oriented programming attack.

4. A first programmable device of a plurality of programmable devices, the first programmable device comprising:
   one or more processors; and
   memory including instructions that, when executed, cause the one or more processors to:
   access standard detection algorithms and content (SDACs);
   access a first set of enhanced detection algorithms and content (EDACs) of a plurality of sets of EDACs, the SDACs and different ones of the sets of EDACs to be initially deployed to respective ones of the programmable devices from a server;
   generate a first set of behavioral data associated with the one or more processors of the first programmable device based on the SDACs;
   generate a second set of behavioral data associated with the one or more processors based on one or more EDACs selected randomly from the first set of EDACs;
   extract a first profile based on analyzing the first set of behavioral data and the second set of behavioral data in real time;
   compare the first profile to a plurality of profiles including a second profile, the profiles corresponding to characteristics of known exploit attacks;
   determine the first profile corresponds to the second profile based on the comparison, the second profile corresponding to an exploit attack; and
   transmit an alert indicative of the exploit attack to an endpoint security product associated with the server to cause the server to distribute the first set of EDACs to a second one of the programmable devices to facilitate detection of the exploit attack at the second programmable device.

5. The first programmable device of claim 4, wherein the one or more processors are to generate at least one of the first set of behavioral data or the second set of behavioral data by:
   extracting data from a performance monitoring unit associated with the one or more processors; and
   storing the data in a platform data collection module.

6. The first programmable device of claim 4, wherein the exploit attack is a return oriented programming attack, a jump oriented programming attack, or a call oriented programming attack.

7. The first programmable device of claim 4, wherein the one or more processors are to select the one or more EDACs based on a policy from the server.

8. A method for improving detection of computer security exploit attacks, the method comprising:
   accessing standard detection algorithms and content (SDACs) and a first set of enhanced detection algorithms and content (EDACs) of a plurality of sets of EDACs, the SDACs and different ones of the sets of EDACs to be initially deployed to respective ones of a plurality of endpoints from a server;
   generating, by executing an instruction with at least one processor of a first endpoint, a first set of behavioral data associated with the at least one processor based on the SDACs;
   generating, by executing an instruction with the at least one processor of the first endpoint, a second set of behavioral data associated with the at least one processor based on one or more EDACs selected randomly from the first set of EDACs;
   extracting, by executing an instruction with the at least one processor of the first endpoint, a first profile based on analyzing the first set of behavioral data and the second set of behavioral data in real time;
   comparing the first profile to a plurality of profiles including a second profile, the profiles corresponding to characteristics of known exploit attacks;
   determining, by executing an instruction with the at least one processor of the first endpoint, the first profile corresponds to the second profile based on the comparison, the second profile corresponding to an exploit attack; and
   transmitting an alert indicative of the exploit attack to an endpoint security product associated with the server to cause the server to distribute the first set of EDACs to a second one of the endpoints to facilitate detection of the exploit attack at the second endpoint.

9. The method of claim 8, wherein the generating of at least one of the first set of behavioral data or the second set of behavioral data includes:
   extracting data from a performance monitoring unit associated with the at least one processor; and
   storing the data in a platform data collection module.

10. The method of claim 8, wherein the one or more EDACs are selected from the first EDACs based on set of a policy from the server.

11. A server for improving detection of computer security exploit attacks, the server comprising:
   one or more processors; and
   memory including instructions that, when executed, cause the one or more processors to:
   distribute standard detection algorithms and content (SDACs) and a plurality of sets of enhanced detection algorithms and content (EDACs) to a plurality of endpoints, the SDACs and different ones of the sets of EDACs to be initially deployed to respective ones of the endpoints; and
   in response to obtaining an indication of a security exploit event from a first endpoint of the plurality of endpoints, the indication identifying detection of the security exploit event based on one or more of a first set of the EDACs, distribute the first set of EDACs to a second one of the endpoints to facilitate detection of the security exploit event at the second endpoint, the first endpoint to transmit an alert including the indication to an endpoint security product associated with the server by:
      generating a first set of behavioral data associated with the first endpoint based on the SDACs;
      generating a second set of behavioral data associated with the first endpoint based on one or more EDACs selected randomly from the first set of EDACs;
      extracting a first profile based on analyzing the first set of behavioral data and the second set of behavioral data in real time;
      comparing the first profile to a plurality of profiles including a second profile, the profiles corresponding to characteristics of known security exploit events; and
      determining the first profile corresponds to the second profile based on the comparison, the second profile corresponding to the security exploit event; and
      generating the alert indicative of the security exploit event.

12. The server of claim 11, wherein the security exploit event is a first security exploit event, the second endpoint has a second set of EDACs, and the one or more processors are to:
   distribute a third set of EDACs from the sets of EDACs to a third one of the endpoints, the third set of EDACs different from the first set of EDACs and the second set of EDACs; and
   in response to obtaining an indication of a second security exploit event from the third endpoint, distribute the third set of EDACs to the first and second endpoints to facilitate detection of the second security exploit event at the first and second endpoints.

13. The server of claim 12, wherein respective ones of the plurality of endpoints are to generate behavioral data associated with one or more processors of the corresponding endpoints based on at least one of the first, second, or third sets of EDACs.

14. The server of claim 11, wherein the one or more processors are to update the first set of EDACs responsive to the indication of the security exploit event.

15. The server of claim 11, wherein the one or more processors are to distribute the SDACs and the first set of EDACs to the plurality of endpoints via one or more network adapters.

* * * * *